July 1, 1924.
R. H. PRICE
CRANK
Filed June 15, 1923
1,499,474
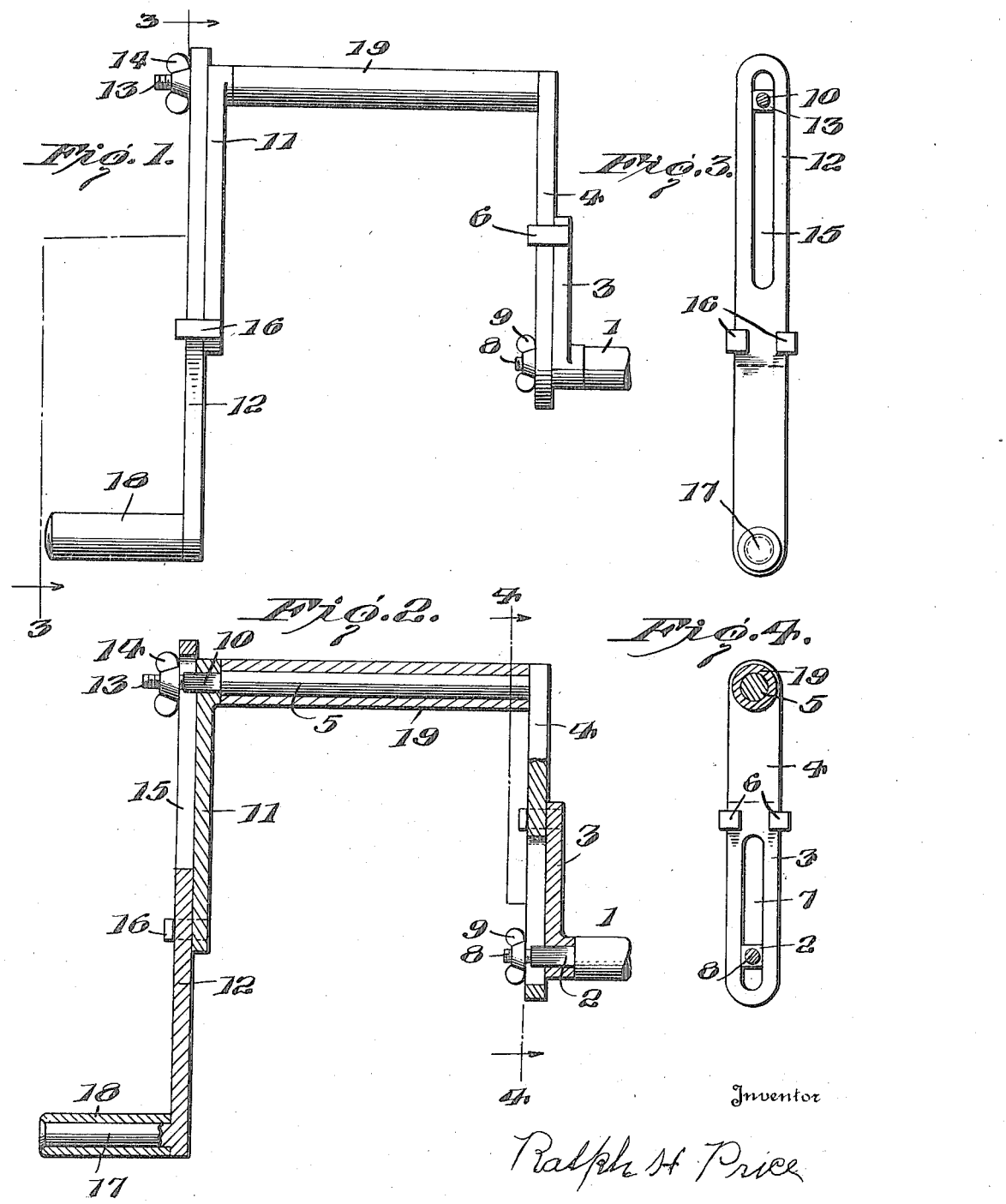
Inventor
Ralph H Price Patented July 1, 1924.

1,499,474

UNITED STATES PATENT OFFICE.

RALPH H. PRICE, OF CROOKSVILLE, OHIO.

CRANK.

Application filed June 15, 1923. Serial No. 645,600.

*To all whom it may concern:*

Be it known that I, RALPH H. PRICE, a citizen of the United States, residing at Crooksville, in the county of Perry and State of Ohio, have invented certain new and useful Improvements in a Crank, of which the following is a specification.

This invention relates to improvements in cranks, particularly adapted for use in connection with mining tools.

The important object of this invention is to provide a crank which is capable of having the arms shortened or lengthened, that is, adjusted to various lengths of swing.

Another object of the invention is to provide a device of the character indicated, which is strong, rigid and effective as a crank of adjustable construction.

Another object of the invention is to provide a device of this kind which is simple of construction that it may be manufactured and sold at a comparatively low cost.

And still another object of the invention is to provide a crank of this character which may be very quickly disassembled, that is, separated into several distinctive elements which may be packed into a comparatively small space in a tool chest or the like.

These and like objects of the invention will be better understood as the description follows and as is pointed out in the appended claims.

Referring to the accompanying drawing which forms a part of this specification,

Figure 1 is a side elevation of a crank, showing same in its complete form.

Figure 2 is a vertical section through same.

Figure 3 is a section taken on line 3—3 of Figure 1, and

Figure 4 is a section taken on line 4—4 of Figure 2.

Referring to the accompanying drawing in detail, like characters will be used to designate like parts in the different views.

The numeral 1 indicates a screw threaded bar, or a bar of any construction for engagement with a mine drilling tool. The bar 1 is provided with a reduced end 2, which is adapted to pass through an arm 3 and a second arm 4, which is formed integral on the end of a shaft 5. The upper portion of the arm 3 is provided with a pair of clips 6 which engage around the arm 4, and the lower portion of the arm 4 is provided with a slot 7, through which extends the reduced portion 2 of the shaft 1. The reduced portion 2 is provided with an extension 8 which is screw threaded and on which is mounted a wing nut 9. By adjusting the wing nut 9, the arm 3 and bar 1 can be adjusted to any height or length relative to the arm 4.

The shaft 5 has a square portion on one end, on which is mounted a sweep comprising members 11 and 12. The square portion 10 of the shaft 5 is provided with an extension 13, which is screw threaded and on which is mounted a wing nut 14. The square portion 10 and screw threaded extension 13 pass through a slot 15 in the upper portion of the member 12 of the sweep. The lower part of the sweep portion 11 is provided with clips 16, which encircle the member 12 as is clearly shown in Figures 1 and 3. By adjusting the wing nut 14, the length of the sweep can be adjusted. As shown in Figures 1 and 2, the sweep member has been adjusted to its entire length.

The member 12 of the sweep is provided with a handle 17 on which is mounted a hand grip 18. The shaft 5 is also provided with a hand grip 19.

In view of the foregoing description of my invention, taken in connection with the accompanying drawing, it is thought that any further explanation as to the construction, operation, and objects of the invention is unnecessary.

While I have shown and described the preferred form of my invention, I realize that various minor changes may be resorted to, without departing from the spirit and scope of the invention as claimed, and therefore, I do not wish to limit myself to the exact details of construction shown, nor to the combination and arrangement of parts.

What I claim as new and desire to secure by Letters Patent is:

1. In a crank, comprising a shaft having a square portion of reduced size formed on one end, a screw threaded extension formed on said reduced portion, an arm formed integral with the opposite end of said shaft, a second arm adjustably connected to the first mentioned arm, and a sweep mounted on the reduced square portion of the shaft and adjusted to various lengths.

2. In a device of the character indicated, comprising a shaft having an arm formed integral on one end, a second arm adjustably attached thereto, said shaft provided with a reduced square portion on one end, a sweep mounted on said reduced square portion, said sweep comprising two parts which are held in slidable engagement with each other, and means for locking said sweep at adjusted positions of various lengths.

In testimony whereof, I have affixed my signature in the presence of two witnesses.

RALPH H. PRICE.

Witnesses:
  H. F. PICKENS,
  C. H. STANBERY.